United States Patent [19]

Warwick

[11] 4,425,005
[45] Jan. 10, 1984

[54] VEHICLE BRAKING SYSTEM AND METHOD OF BRAKING

[75] Inventor: Edward H. Warwick, Englewood, Ohio

[73] Assignee: General Motors Corporation, Detroit, Mich.

[21] Appl. No.: 362,243

[22] Filed: Mar. 26, 1982

[51] Int. Cl.³ ............................................. B60T 13/74
[52] U.S. Cl. ...................................... 303/3; 188/159; 188/345
[58] Field of Search ................... 303/3, 15, 16, 2, 100, 303/4, 13, 20, 6 R, 6 A, 6 C, 18; 188/271, 159, 345, 160, 106 R, 105; 192/2

[56] References Cited

U.S. PATENT DOCUMENTS

| | | | |
|---|---|---|---|
| 2,591,224 | 4/1952 | Williams et al. | 303/3 |
| 3,275,380 | 9/1966 | May | 303/3 |
| 3,536,360 | 10/1970 | Engle | 303/3 |
| 4,270,806 | 6/1981 | Venkateperumal et al. | 303/3 |
| 4,283,092 | 8/1981 | Sanka et al. | 303/3 |

Primary Examiner—Douglas C. Butler
Attorney, Agent, or Firm—D. D. McGraw

[57] ABSTRACT

A vehicle braking system having one brake circuit actuated directly by pressure generated in a master cylinder and a second brake circuit actuated, by pressure generated by actuation of the master cylinder, to the extent that regenerative braking effort acting on the wheels having brakes in the second brake circuit is insufficient to provide the desired total braking effort on those wheels. When regenerative braking on those wheels is sufficient to meet the braking effort demand, the service brake system does not supply any additional braking effort. A compliance control member provides the feel of input travel and force equivalent to the regenerative braking effort actually at the wheels of the second brake circuit when regenerative braking is occuring while the vehicle is being braked. The absorbed displacement and force is fed back to the second brake circuit by the compliance control member when the regenerative braking effort becomes insufficient to meet the braking effort demanded from the brakes of the second brake circuit.

3 Claims, 1 Drawing Figure

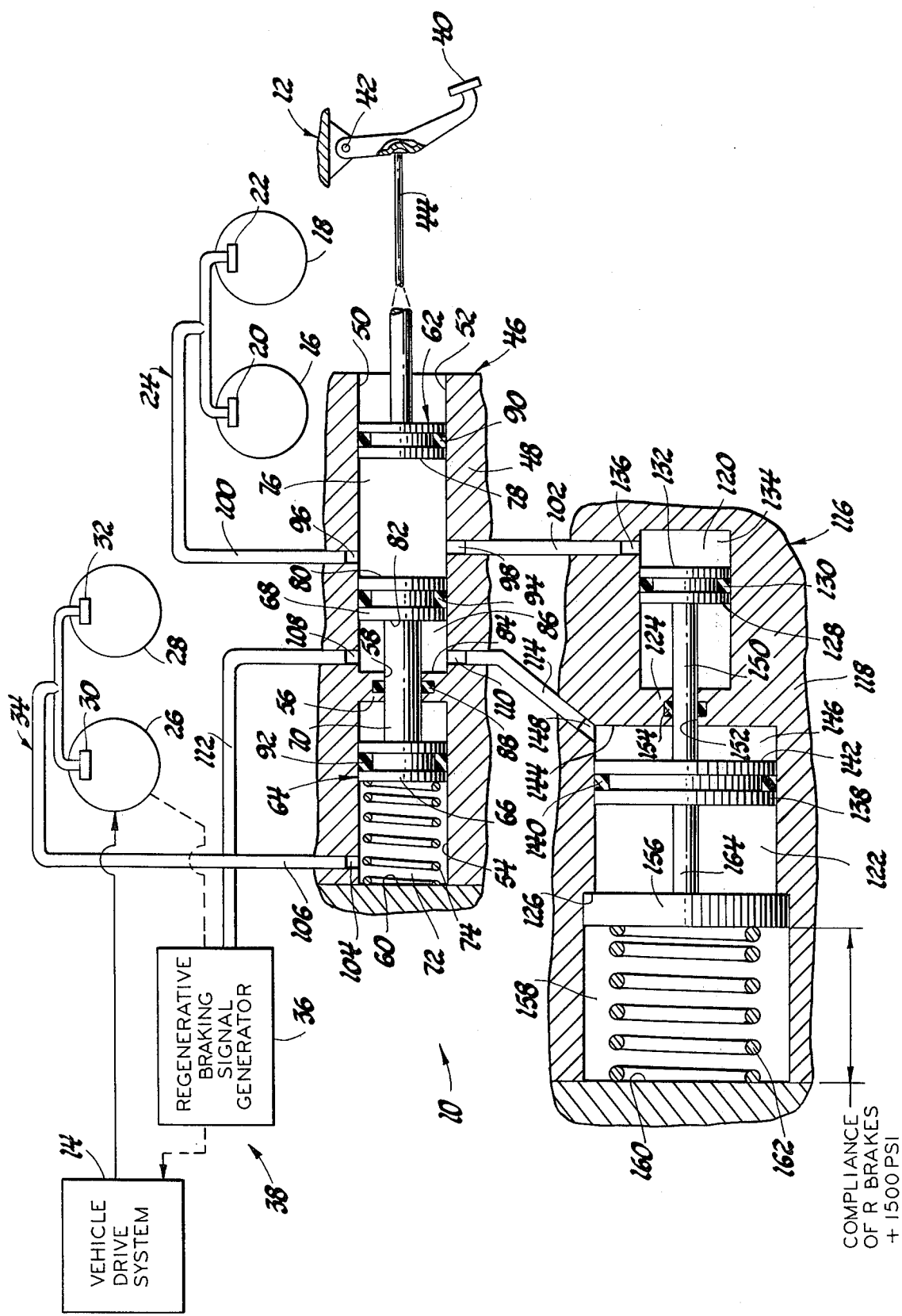

VEHICLE BRAKING SYSTEM AND METHOD OF BRAKING

The invention relates to a braking system for a motor vehicle having first and second axle sets of vehicle wheels, and a method of braking the vehicle. It more particularly relates to a braking system having first and second sets of wheel brakes respectively controlled by the first and second brake circuits, and regenerative braking means selectively operable to provide regenerative vehicle braking to the second axle set of vehicle wheels. The system embodying the invention includes a dual master cylinder assembly having primary and secondary pressurizing chambers respectively connected to the first and second brake circuits to actuate those circuits. The master cylinder has an input member and primary and secondary pistons operating to pressurize fluid in the primary and secondary pressurizing chambers. The secondary piston has a piston head and a pressure chamber axially intermediate the primary and secondary pressurizing chambers so that pressure in this intermediate pressure chamber acts on the piston head to resist pressurizing movement of the secondary piston. A compliance control member is connected in the second brake circuit. This control member has a first piston area subjected to the pressure generated in the primary pressurizing chamber and a second piston area subjected to the pressure of the intermediate pressurizing chamber. The compliance control member includes compliance means opposing the force generated by the pressures acting on the piston areas with pressure and displacement characteristics which are substantially the same as the pressure and displacement characteristics of the second set of wheel brakes which is operated by the second brake circuit. The system embodying the invention also includes an arrangement generating a pressure signal which acts in the master cylinder intermediate pressure chamber on the piston head to oppose the force generated by pressure acting on the secondary piston head in the primary pressurizing chamber. The pressure signal also acts on the second piston area of the compliance control member. The pressure signal generated is in accordance with and responsive to the amount of regenerative vehicle braking of the second axle set of vehicle wheels so that the second brake circuit can be pressurized by the master cylinder secondary piston only to the extent that the second axle set of vehicle wheels are not being braked by the regenerative braking arrangement. The compliance control member provides the master cylinder input member with travel and force feel responsive to displacement and pressure equivalent to the braking effort at the second set of axle wheel brakes.

IN THE DRAWING

The single FIGURE is a schematic representation of a vehicle braking system embodying the invention and capable of carrying out the inventive method of brake operation.

The vehicle braking system 10 schematically illustrated in the drawing is installed in a vehicle 12 having a vehicle drive system 14. The vehicle also has a first axle set of wheels 16 and 18 respectively braked by wheel brakes 20 and 22. Brakes 20 and 22 are part of a first brake circuit 24. The vehicle has a second axle set of wheels 26 and 28 respectively braked by brakes 30 and 32. The brakes 30 and 32 are in a second brake circuit 34. The vehicle drive system 14 is schematically illustrated as driving the second axle set of wheels 26 and 28. A regenerative braking signal generator 36 forms a part of regenerative braking means 38, which is connected to the wheels 26 and 28 and to the vehicle drive system 14 for that purpose.

The system 10 includes a brake pedal 40 pivotally supported at 42 on a suitable part of the vehicle 12 so as to be actuated by the vehicle operator in the usual manner to brake the vehicle. A push rod 44 operatively connects the brake pedal 40 to a master cylinder assembly 46. While no power brake booster is illustrated, one may be used between the brake pedal and the master cylinder assembly if desired.

The master cylinder assembly 46 is schematically illustrated as including a housing 48 having a bore 50 formed therein. The bore 50 is divided into a rear section 52 and a forward section 54 by a web 56 having an opening 58 through it which is smaller in diameter than the diameter of bore sections 52 and 54. The forward end of bore 50 is closed at 60. A primary pressurizing piston 62 is sealingly and reciprocably received in the rear bore section 52 and is suitably connected to the input member or push rod 44 to be actuated when the brake pedal 40 is actuated to apply the brakes. The secondary pressurizing piston 64 is formed to include a pair of axially spaced piston heads 66 and 68 joined by a piston rod section 70. Piston head 66 is sealingly and reciprocably received in the forward bore section 54 so as to define, with that bore section, the secondary pressurizing chamber 72. A piston return spring 74 is contained within chamber 72 and continually urges the secondary piston 64 rearwardly toward the primary piston. The secondary piston head 68 is sealingly and reciprocably received in the rear bore section 52 axially intermediate the web 56 and the primary piston 62.

The primary pressurizing chamber 76 is defined by the portion of bore section 52 between the forward face 78 of primary pressurizing piston 62 and the rear face 80 of the secondary piston head 68. The piston rod section 70 joining the piston heads 66 and 68 extends through the opening 58 of web 56 in sealing relation so as to seal the chambers formed on either side of web 56 by the adjacent bore sections and the piston heads 66 and 68. The forward face 82 of the secondary piston head 68, the rear face 84 of web 56 and the forward portion of the bore section 52 define an intermediate pressure chamber 86. Suitable seals 88, 90, 92 and 94 are respectively provided in grooves formed in web 56, primary piston 62, and secondary piston heads 66 and 68. The primary pressurizing chamber 76 is provided with ports 96 and 98 which act as outlets when fluid is being pressurized in that chamber. Port 96 is connected to conduit 100 which is in fluid communication with brakes 20 and 22. Port 98 is in fluid communication with conduit 102.

Secondary pressurizing chamber 72 is provided with a port 104 which acts as a fluid pressure outlet when brake fluid is being pressurized in chamber 72. Port 104 is connected to conduit 106, which is in fluid communication with brakes 30 and 32 and forms a part of the second brake circuit 34.

The intermediate pressurizing chamber 86 is provided with ports 108 and 110. Port 108 is in fluid communications with the regenerative braking signal generator 36 through conduit 112. The regenerative braking signal generated in generator 36 is a fluid pressure signal transmitted through conduit 112 and port 108 to chamber 86. Port 110 is connected through conduit 114 to the second brake circuit compliance control member 116, described below.

The compliance control member 116 is schematically illustrated as including a housing 118 having a pair of chambers 120 and 122 formed therein. Chamber 120 is smaller in cross section area than chamber 122 and is separated from that chamber by a housing web section 124. Chamber 122 has the end thereof opposite web section 124 formed with a shoulder 126 dividing chamber 122 into piston receiving section and a compliance member section. The compliance member section is slightly larger in diameter than the piston receiving section.

A piston 128 is reciprocably received in chamber 120 and has a seal 130 in a groove formed therein to prevent fluid leakage past the piston. The piston rear face 132 of piston 128 cooperates with the rear end of chamber 120 to define a pressure chamber section 134. A port 136 communicates with chamber section 134 and has conduit 102 connected thereto so that chamber 134 is in continuous fluid communication with the primary pressurizing chamber 76 of the master cylinder assembly 46. Thus the pressure in the first brake circuit 24 for actuating the axle set of brakes 20 and 22 is always exerted on the effective area of piston 128 represented by piston face 132 and urges the piston in a forward direction as seen in the drawing.

Another piston 138, larger in diameter than piston 128, is reciprocably received in chamber 122 axially intermediate shoulder 126 and housing web section 124. Piston 138 is provided with a seal 140 in a peripheral groove so as to prevent fluid leakage past the piston. Piston 138 has a rear face 142 which cooperates with the rear portion of chamber 122, including the forward face 144 of the housing web section 124, to define a pressure chamber section 146. A port 148 opening into chamber section 146 is connected with conduit 114 and, therefore, continuous fluid pressure communication is provided from the regenerative braking signal generator 36 to the intermediate pressure chamber 86 and the compliance control member chamber section 146. A piston rod 150 extends through an opening 152 in the housing web section 124 and is in force transmitting engagement with pistons 128 and 138. A seal 154 received in the housing web section and seals around rod 150 so as to prevent fluid leakage from chamber section 146 to the forward end of chamber 120.

Another piston 156 is reciprocably received in the forward portion 158 of chamber 122, that chamber forward portion being defined as the part of the chamber axially intermediate the shoulder 126 and the forward face 160 of chamber 122. Piston 156 need not be fluid sealed relative to the chamber wall, and is illustrated as having no seal. The compliance spring 162 received in the chamber forward portion 158 is a compression spring having a predetermined load and spring rate. The spring acts on the forward face 160 of chamber 122 and on piston 156 so that it continually urges piston 156 toward engagement with shoulder 126. A piston rod section 164 connects pistons 138 and 156 in force transmitting relation so that the force of the compliance spring 162 may be transmitted to piston 138 and through rod 150 to piston 128 so long as piston 156 is not in abutting relation with shoulder 126.

The force and load characteristics of the compliance spring 162 are such that the spring force opposes the force generated by the pressures in chamber sections 134 and 146 acting on the piston faces 132 and 142. The spring rate and force-absorbing action results in pressure and displacement characteristics substantially the same as the pressure and displacement characteristics of the set of wheel brakes 30 and 32. Therefore, the compliance control member 116 provides the push rod 44 and brake pedal 40 with travel force feel responsive to displacement and pressure equivalent to the braking effort at the second set of axle wheels 26 and 28 when the brake system is actuated. In accomplishing this, the vehicle wheels 26 and 28 are braked with regenerative braking effort from the vehicle drive system through a braking force transmittal arrangement, schematically illustrated by the dashed line joining the wheels 26 and 28 with the vehicle drive system 14 through the regenerative braking signal generator 36. The regenerative braking signal generated by generator 36 is a fluid pressure signal exerted through conduit 112 into pressure chambers 86 and 146. This pressure acts in chamber 86 on the effective area of piston face 82 to resist or prevent service brake actuation of the brakes 30 and 32 by means of master cylinder generated pressure in chamber 72 in accordance with the regenerative braking effort acting on the wheels 26 and 28. When the regenerative braking effort acting on wheels 26 and 28 is insufficient to provide the amount of braking effort required by the vehicle operator in pushing on brake pedal 40, service brake actuation of the brakes 30 and 32 by pressure generated in the secondary pressurizing chamber 72 will combine with the regenerative braking effort on wheels 26 and 28 so that the combination thereof provides the desired braking effort. The amount of input displacement and force equivalent to the input displacement and force required to produce service braking effort equal to the regenerative braking effort being applied to the wheels 26 and 28 is absorbed by the compliance control member by compressing spring 162. This is accomplished by pressure acting in chamber section 134 and 146 on pistons 128 and 138. This causes a displacement of the primary piston 62 as the primary pressurizing chamber 76 displaces fluid into the increasing volume of chamber section 134.

When the desired braking effort put out by brakes 30 and 32 and acting on wheels 26 and 28 becomes greater than the regenerative braking effort being applied through the regenerative braking means 38, the displacement and force absorbed by movement of the pistons of the compliance control member against spring 162 is fed to the service brakes 30 and 32 as spring 162 expands, moving the pistons 128 and 138 rearwardly as seen in the drawing, displacing brake fluid under pressure from chamber section 134 through conduit 102 into the primary pressure chamber 76 so that the displacement and force acts on the secondary piston 64 at the same time that the regenerative braking signal pressure in intermediate chamber 86 is decreased because of the decreased or insufficient regenerative braking effort being applied. Thus the absorbed displacement and force is transferred back to the master cylinder assembly 46 and acts on the secondary piston 64 to pressurize brake fluid in chamber 72 and increases the brake actuating pressure causing brakes 30 and 32 to operate. The net effect is the achievement of total braking force acting on wheels 26 and 28, which is a combination of regenerative braking force and braking force exerted through the brake circuit 34, to obtain the desired braking effort. If there is substantially no regenerative braking effort involved, as is the case when the vehicle is proceeding very slowly or is stopped, substantially all of the braking effort will be exerted on wheels 26 and 28 through the service brake system actuating brakes 30 and 32.

The embodiments of the invention in which an exclusive property or privilege is claimed are defined as follows:

1. In a vehicle brake system having a first driving wheel capable of being braked by the combination of regenerative braking and vehicle service brakes, a second wheel capable of being braked by vehicle service brakes alone, and vehicle service brake actuating means including service brakes at said wheels, a first brake circuit for actuating the service brakes at the first wheel, a second brake circuit for actuating the service brakes at the second wheel and adapted to provide a signal of second brake circuit actuation, and an input member controlled by vehicle operator to provide input member travel and input force, the improvement to combine regenerative braking and service brakes in a manner to effect a desired braking effort at both wheels, said improvement comprising:

signal generating means generating a signal directly proportional to the amount of regenerative braking effort acting on said first wheel;

first signal receiving means receiving said signal to generate a sufficient force in opposition to first brake circuit actuation of the service brakes of the first wheel to permit such first brake circuit actuation only to the extent that said amount of regenerative braking effort is less than the amount of braking effort at the first wheel as required by the vehicle operator's control of the input member;

and a first brake circuit compliance control member receiving said regenerative braking effort signal and said signal of second brake circuit actuation and including a first means operating in one manner in response to said signals, said control member including second means operating in a manner to oppose the operator of said first means and having operating characteristics which are substantially the same as the actuating characteristics of the vehicle service brake actuating means for the service brakes at said first wheel when the first wheel is being braked only by the vehicle service brakes to produce all of the desired braking effort acting on the first wheel, so that the travel and input force of the input member felt by the vehicle operator during control thereof are substantially the same during all braking of said wheels irrespective of the extent that regenerative braking effort is used.

2. In a vehicle having first and second brake circuits, first and second axle sets of vehicle wheels having first and second sets of wheel brakes respectively controlled by said first and second brake circuits, and regenerative braking means selectively operable to provide regenerative vehicle braking to said second axle set of vehicle wheels, the improvement comprising:

a master cylinder assembly having a primary piston and a secondary piston and primary and secondary pressurizing chambers in which brake fluid is pressurizable, said primary chamber being in said first brake circuit and said secondary chamber being in said second brake circuit, said secondary piston having a piston head and a pressure chamber axially intermediate said primary and secondary pressurizing chambers so that pressure in said pressure chamber acting on said piston head resists pressurizing movement of said secondary piston, and an operator-operated movable input member for exerting actuating force on said primary piston;

a second brake circuit compliance control member having a first piston area subjected to the pressure of said primary pressurizing chamber, a second piston area subjected to the pressure of said pressure chamber, and compliance means opposing the force generated by the pressure acting on said piston areas with pressure and displacement characteristics substantially the same as the pressure and displacement characteristics of said second set of wheel brakes;

and pressure signal generating means generating a pressure signal acting in said master cylinder pressure chamber on said piston head and also acting on said second piston area, said pressure signal being in accordance with and responsive to the amount of regenerative vehicle braking of said second axle set of vehicle wheels so that said second brake circuit can be pressurized by said secondary piston only to the extent that said second axle set of vehicle wheels are not being braked by said regenerative braking means;

said compliance control member providing said input member with travel and force feel responsive to displacement and pressure equivalent to the braking effort at said second set of axle wheels.

3. A method of braking a vehicle comprising the steps of:

(a) generating service brake actuating energy with input displacement and force characteristics reflecting the amount of desired vehicle braking effort;

(b) actuating the service brakes on a first set of vehicle wheels with generated energy of step (a) while (c) braking a second set of vehicle wheels with regenerative braking effort from the vehicle drive system (d) preventing service brake actuation of service brakes on the second set of vehicle wheels with the generated energy of step (a) in accordance with the regenerative braking effort acting on the second set of vehicle wheels;

(e) permitting service brake actuation of the service brakes on the second set of vehicle wheels with generated energy of step (a) to the extent that the regenerative braking effort of step (c) is insufficient;

(f) absorbing the amount of input displacement and force equivalent to the input displacement and force required to produce service braking effort equal to the regenerative braking effort being applied in step (c);

(g) and feeding the absorbed displacement and force to the service brakes on the second set of vehicle wheels when the desired braking effort at these wheels becomes greater than the regenerative braking effort applied in step (c).

* * * * *